March 14, 1944.   T. T. ALLISON, JR   2,344,014
WARNING SIGNAL
Filed March 26, 1942   2 Sheets-Sheet 1
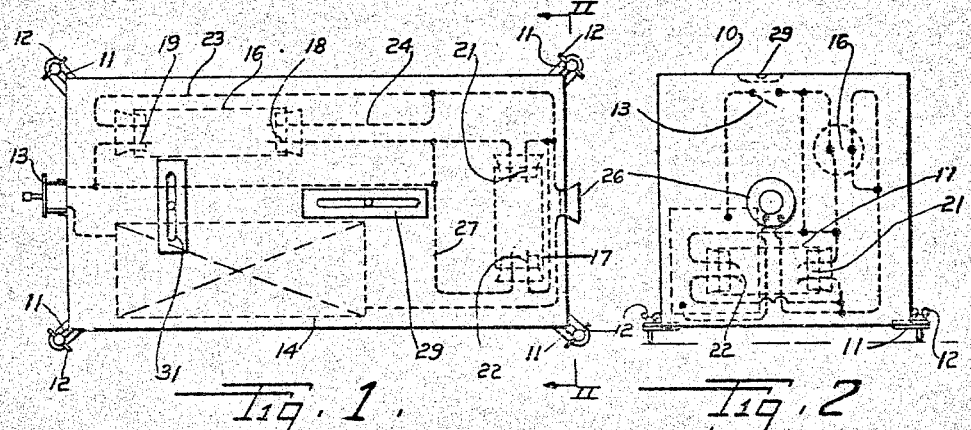
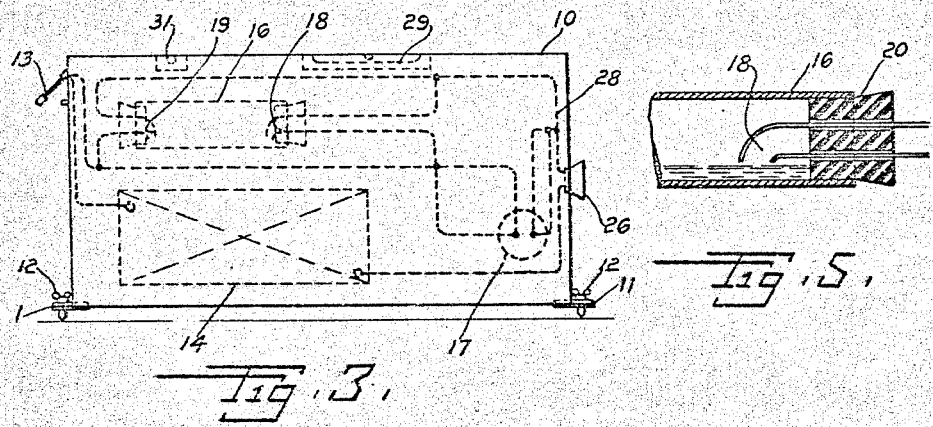
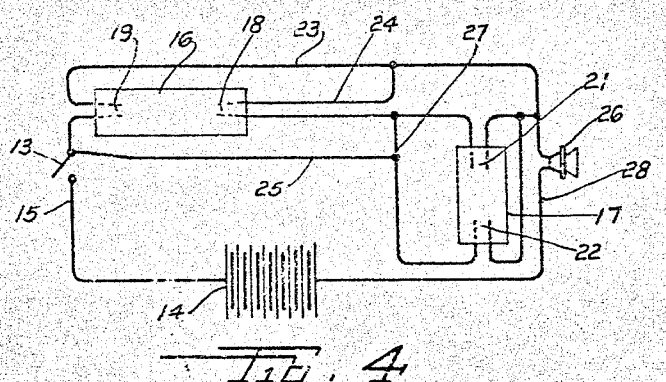
INVENTOR
THOMAS T. ALLISON JR.
BY
Henry L. Jennings
ATTORNEY

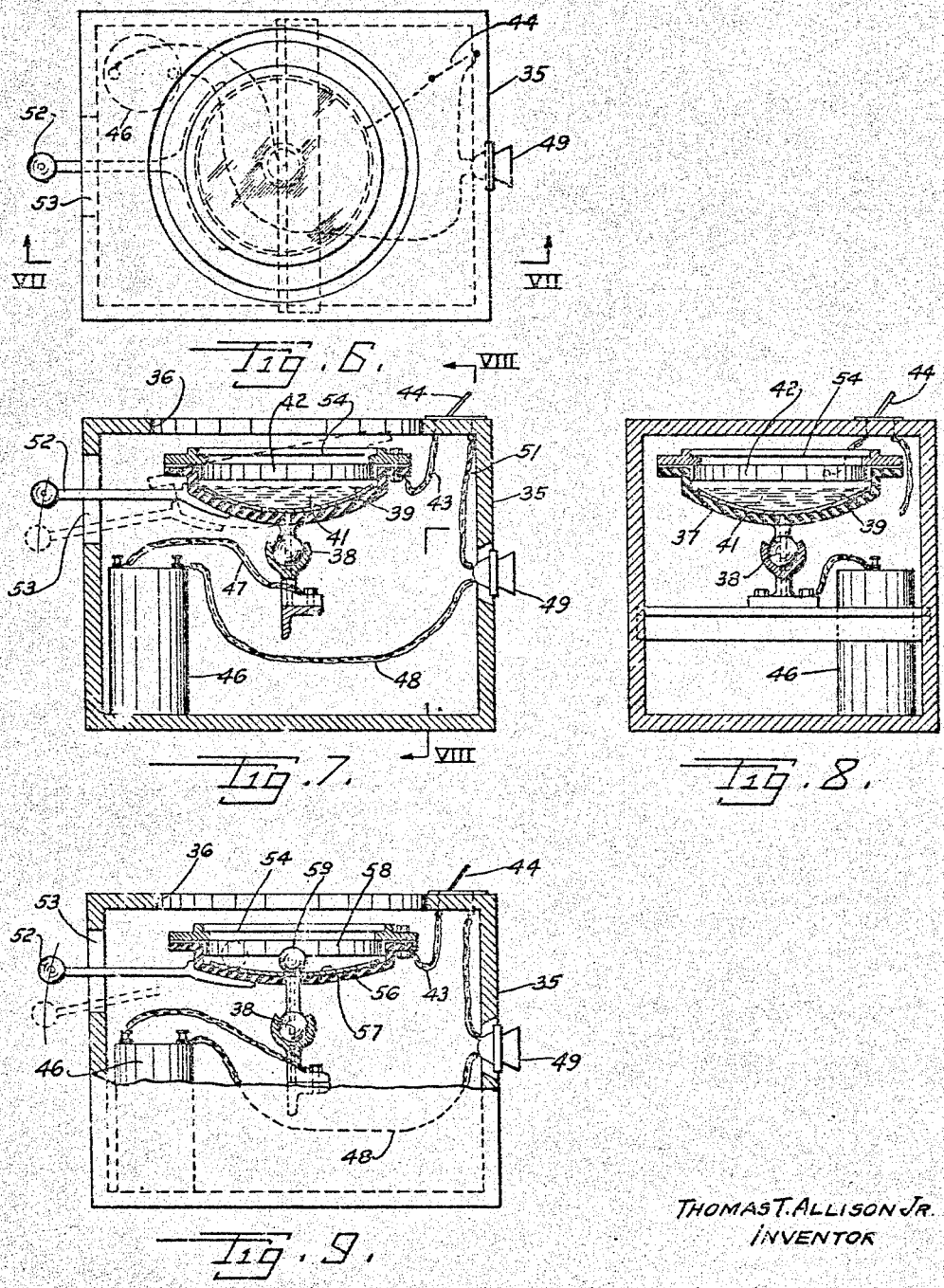

Patented Mar. 14, 1944

2,344,014

UNITED STATES PATENT OFFICE 2,344,014

WARNING SIGNAL

Thomas T. Allison, Jr., Birmingham, Ala., assignor of one-half to Arthur T. McWane, Birmingham, Ala.

Application March 26, 1942, Serial No. 436,225

1 Claim. (Cl. 200—52)

My invention relates to warning signals, more particularly to such signals which are adapted to notify the owner of a parked automobile when it is being tampered with, and has for an object the provision of a portable device which may be placed in any available space in an automobile and which will sound an alarm whenever it is caused to assume an off-level position.

A further object of my invention is to provide a portable warning signal adapted to be placed in a parked automobile and to sound an alarm when the automobile is disturbed.

A more specific object of my invention is to provide a warning signal adapted to sound an alarm when it assumes an off-level position in any direction, whereby when placed in a parked automobile it will warn when the vehicle is disturbed, as when removing the tires.

Apparatus embodying features of my invention is illustrated in the accompanying drawings forming a part of this application, in which Fig. 1 is a plan view showing one form of my invention;

Fig. 2 is an end view looking in the direction of the arrows II—II of Fig. 1;

Fig. 3 is a side elevation of the same;

Fig. 4 is a wiring diagram showing the arrangement of the circuits in the apparatus shown in Figs. 1 to 3;

Fig. 5 is a detail view showing the arrangement of the contact points in one of the circuit closing tubes;

Fig. 6 is a plan view showing a modified form of my invention;

Fig. 7 is a sectional view taken along the line VII—VII of Fig. 6;

Fig. 8 is a sectional view taken along the line VIII—VIII of Fig. 7; and

Fig. 9 is a sectional view similar to Fig. 7, and showing a still further modified form of my invention.

Referring to the device shown in Figs. 1 to 5 inclusive, I show a portable casing 10 in the form of a relatively small box that can be readily carried about and placed in any desired position. The four lower corners of the casing are provided with lugs 11 through which extend levelling screws 12, so that the device may be readily levelled after being placed in an automobile and thus compensate for grades or uneven roadway.

Inside the casing 10 is an electric battery 14, having connected thereto a wire 15 comprising part of an electric circuit controlled by a switch 13. Also inside the casing are two tubes 16 and 17 which are disposed at right angles to each other, each of which is partially filled with a conductive fluid, such as mercury, as shown in Fig. 5. The tubes 16 and 17 are made of suitable insulating material, preferably glass. At one end of the tube 16 are spaced contacts 18, normally positioned just above the surface of the mercury, as shown in detail in Fig. 5, and at the other end are similar spaced contacts 19. The contacts 18 and 19 extend through closures 20 made of suitable insulating material. The tube 17 likewise is provided at one end with similar spaced contacts 21 and at the other end with spaced contacts 22, all of the said spaced contacts being adapted to be connected by the mercury in the associated tube when the casing 10 is off level a sufficient amount for the mercury to gravitate to one end of a tube and rise to the level of the contacts. The tubes 16 and 17 being set at right angles to each other, if the casing is tilted in any direction the mercury in the tube will run to one end of at least one of the tubes.

Assuming that the casing is tilted so that the mercury covers the contacts 19 of tube 16, current flows from the battery 14 through the wire 15 to switch 13 through the contacts 19 and wire 23 to a warning signal 26. From the warning signal the current flows through a wire 28 back to the battery 14. The warning signal, which may be in the form of a horn or bell, will continue to sound until the device is again placed in a level position, or so long as the battery 14 supplies the necessary current. Likewise if the casing is tilted so that the spaced contacts 18 are covered with mercury, current flows from the switch 13 through a wire 25 and connecting wire 27 through the spaced contacts 18 to the wire 23, and thence to the warning signal 26 and back to the battery 14, as already described. If the casing 10 is tilted in a direction transverse to either of those just described, the mercury in the tube 17 will gravitate to one end or the other of the tube and complete the circuit through the double contacts 21 or 22, as the case may be, and thence to the warning signal 26 and back to the battery.

In use, my improved device is placed in any suitable position in a parked automobile and levelled up by means of the levelling screws 12. To aid in levelling, I place two level indicators 29 and 31 in the lid of the casing 10, as shown in Fig. 1. The said indicators being at right angles to each other, the device may be levelled both longitudinally and transversely. When levelled up, the switch 13 is closed and the apparatus will then sound a warning signal 26 upon any disturbance of the level position of the apparatus. A momentary jarring of the automobile in which it is placed might produce a short blast of the warning signal, whereas if the car were jacked up at any corner, for removing a tire, the warning signal will sound as long as the device is in off-level position.

Referring now to Figs. 6 to 9 inclusive, I show a modified, simpler form of my invention comprising a casing 35 having an opening 36 in the top. Disposed within the casing is a shallow vessel 37, which is preferably made of some suitable insulating material, and which is supported by a spherical frictional mounting 38 centrally of the bottom thereof. The mounting 38 is made of metal and connects through the bottom of the vessel 37 with a metal plate 39. The vessel 37 contains a liquid conducting medium 41, such as mercury. Extending around the upper part of the vessel 37 is a metal ring 42 to which is connected a wire 43 leading to a switch 44 on top of the casing 35. Disposed within the casing is an electric battery 46 connected at one side through a wire 47 to the metal plate 39 through the spherical mounting 38. A wire 48 leads from the other side of the battery to a warning signal 49 in the side of the casing 35, and thence through a wire 51 to the switch 44. It will be seen that if the switch 44 is closed and the vessel 37 is in an off-level position in any direction a sufficient amount for the mercury to bridge the space between the metal plate 39 and the ring 42, the circuit will be completed from the battery 46 through the metal plate 39, ring 42, wire 43, switch 44, wire 51 to the warning signal 49, and thence back to the battery.

The vessel 37 has attached thereto a handle 52 which extends outside the casing 35 through an opening 53 in the side of the casing, whereby the vessel may be levelled up. The vessel is provided with a glass cover 54 which prevents the mercury spilling and the position of the mercury in the vessel may be observed through the cover 54 and the opening 36 in the casing. Thus the vessel may be visually levelled when the apparatus is set in a parked automobile. If the vessel is tilted for any reason, as when the car is disturbed, the mercury bridging the space between the metal plate 39 and the ring 42 will complete the circuit and sound the warning signal 49.

In Fig. 9 I show a still further modification of my invention, in which a shallow vessel 56 is mounted in the casing 35 and is provided with a metal plate 57 in the bottom and with a ring 58 extending around the vessel, as heretofore described in connection with Figs. 6 to 8 inclusive. Instead of employing mercury in the vessel 56 to bridge the space between the plate 57 and ring 58, as in the previous modification, I employ a metal ball 59, which is adapted to roll to one side of the vessel 57 when it assumes an off-level position, and close the contacts to complete the circuit to the warning signal 49, all as heretofore described.

From the foregoing it will be apparent that I have devised an improved warning signal of the character described which is simple of design, economical of manufacture, and which is adapted to warn of tampering with a parked automobile, especially for the removal of tires.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are specifically set forth in the appended claim.

What I claim is:

In an electric circuit closer, a freely portable casing, a relatively shallow vessel in the casing, means for adjusting the vessel to a level position in the casing, conducting material in the bottom of said vessel connected to one side of said circuit, a ring conductor mounted on the vessel spaced from the bottom thereof and connected to the other side of the circuit, and a conducting fluid in the vessel adapted to bridge the space between the conducting material in the bottom of the vessel and the ring conductor to close the circuit when the vessel assumes an off-level position.

THOMAS T. ALLISON, Jr.